United States Patent
Barss (10) Patent No.: US 6,171,424 B1
(45) Date of Patent: Jan. 9, 2001

(54) METHOD OF MAKING FABRIC VENETIAN BLINDS

(75) Inventor: James Barss, Porter Corners, NY (US)

(73) Assignee: Comfortex Window Fashions, Watervlier, NY (US)

(*) Notice: Under 35 U.S.C. 154(b), the term of this patent shall be extended for 0 days.

(21) Appl. No.: 09/235,447

(22) Filed: Jan. 22, 1999

Related U.S. Application Data (63) Continuation-in-part of application No. 08/947,608, filed on Oct. 9, 1997, now Pat. No. 6,024,819.

(51) Int. Cl.[7] .............................. B65H 81/00; B65H 69/06
(52) U.S. Cl. ......................... 156/174; 156/193; 156/195; 156/266; 156/159; 242/271
(58) Field of Search ............................ 156/65, 174, 193, 156/195, 250, 251, 258, 266, 159, 157; 242/471

(56) References Cited

U.S. PATENT DOCUMENTS

| | | | |
|---|---|---|---|
| 3,384,519 | 5/1968 | Froget | 156/65 |
| 4,176,566 | 12/1979 | Patterson et al. | 83/29 |
| 4,246,053 | * 1/1981 | Platt et al. | 156/159 |
| 4,631,217 | 12/1986 | Anderson | 428/118 |
| 4,945,968 | 8/1990 | Schebly et al. | 160/54.1 |
| 5,287,908 | 2/1994 | Hoffmann et al. | 160/121.1 |
| 5,313,999 | 5/1994 | Colson et al. | 160/121.1 |
| 5,320,154 | 6/1994 | Colson et al. | 160/121.1 |
| 5,339,882 | 8/1994 | Judkins | 160/84.1 |
| 5,394,922 | 3/1995 | Colson | 160/121.1 |
| 5,456,304 | 10/1995 | Colson | 160/121.1 |
| 5,490,553 | 2/1996 | Colson | 160/84.06 |
| 5,603,369 | 2/1997 | Colson et al. | 160/84.06 |
| 5,638,880 | 6/1997 | Colson et al. | 160/84.01 |
| 5,664,613 | 9/1997 | Jelic | 160/84.05 |

FOREIGN PATENT DOCUMENTS

| | | |
|---|---|---|
| 0 482 793 A1 | 4/1992 | (EP). |
| WO 99/16595 | 8/1999 | (WO). |

* cited by examiner

Primary Examiner—Michael W. Ball
Assistant Examiner—John T. Haran
(74) Attorney, Agent, or Firm—Buchanan Ingersoll, P.C.

(57) ABSTRACT

In a method of making rolls or strips of material having no flaws except joints a supply of material, such as a roll of fabric is inspected for flaws. If any flaws are discovered portions of the material containing the flaws are cut away. The material is attached together after each portion is removed to create a joint for each reattachment. The portions that are cut away are sized so that the joints will be separated by a multiple of a selected distance from one another. The resulting material can then be fabricated into a panel of window covering material in which all the joints are co-linear along a perpendicular to the surface of the material. The joints are positioned so that they will be on a cut line for subsequent processing. In one embodiment the material is wound into a tubular structure that is cut along the joints to form a panel of window covering material.

26 Claims, 9 Drawing Sheets

METHOD OF MAKING FABRIC VENETIAN BLINDS

CROSS REFERENCE TO RELATED APPLICATION

This is a continuation-in-part of U.S. patent application Ser. No. 08/947,608, filed Oct. 9, 1997 now U.S. Pat. No. 6,024,819.

FIELD OF INVENTION

This invention relates to manufacture of window coverings, and more particularly to the field of venetian blinds having front and rear panels or sheer or translucent fabric between which are arrayed a series of relatively opaque fabric slats or vanes which can be tilted for light control by means of limited rotation of a wind-up roll to which the front and rear panels are connected.

BACKGROUND OF THE INVENTION

The most familiar type of venetian blind window covering comprises a series of rigid slats or vanes suspended on ladders that extend from a headrail to a bottomrail. The slats are typically wood, plastic or metal, and rest on the ladder rungs. The slats are tilted from an open position to a closed position by moving the rails of each ladder in opposite directions relative to one another. The entire array can be raised and lowered by lift cords which act to lift a bottom rail.

A modified type of venetian blind is disclosed in U.S. Pat. No. 3,384,519 to Froget. There, the ladder cord system is replaced by front and rear cloth panels to which the vanes are heat welded. Preferably, the cloth panels and vanes are all made of thermoplastic yarns to facilitate bonding by heat welding. Partial rotation of an upper drum, to which the panels are connected, shifts the panels relative to each other thereby causing the vanes to tilt for light control.

Several more recent patents are directed to modifications of Froget's basic idea, wherein the vanes are made of flexible fabric, adhesively bonded to the front and back panels. Additionally, the entire array can be retracted from the window opening by winding it onto an upper wind-up roller by means of cords which lift a bottom rail. Representative of these patents are U.S. Pat. Nos. 5,287,908; 5,313,999; 5,320,154; 5,394,922 and 5,456,304, all assigned to Hunter Douglas, Inc. and U.S. Pat. No. 5,339,882 to Ren Judkins.

These fabric venetians are popular and beautiful products that sell at relatively high prices and incorporate delicate and costly fabrics to achieve the best aesthetic appearance. Such fabric is likely to include flaws such as broken or snagged threads. Such flaws usually are visible in the otherwise uniform and fine mesh of the sheer fabric. Defects such as these are unacceptable in the final product, which is cut from large manufactured bolts of the compound facings-and-strips fabric. Finished-to-size shades must be cut from bolts by positioning to avoid any such flaws, leading to very high waste factors in the cutting of compound fabric bolts. Still, it is not possible to require perfect cloth from the weaver or knitter, and so the waste has contributed greatly to the high cost of these shades.

A second way to manufacture fabric venetians is to use strips in the front panel, the back panel or both panels. U.S. Pat. No. 5,664,613 to Jelic describes another form of construction of a fabric venetian blind. A continuous panel of relatively translucent material forms one facing of the blind. To that panel is bonded a series of parallel fabric strips at uniform intervals. Each strip comprises two adjacent portions of dissimilar material, one being relatively translucent and the other relatively opaque. The free end of the opaque portion is bonded to the facing panel, while the free edge of the translucent portion is bonded to the adjacent strip at the junction line of that strip's two portions. The assembled translucent portions of the constituent strips become the second facing panel of the completed blind. That is, the second facing panel, rather than being a single continuous panel of fabric, is a composite of several parallel strips, each having a height dimension approximately equal to the width (or depth) of the vanes.

U.S. Pat. Nos. 5,490,553 and 5,603,369, assigned to Hunter Douglas, disclose in FIGS. 16–19 a vertical blind wherein each vertical blind is formed of the same strip of material as an adjoining portion of a facing panel on one side of the vanes. The single facing is a composite of narrow vertical strips. The vane portion of this strip is doubled back on itself. Another patent assigned to Hunter Douglas, U.S. Pat. No. 5,638,880, discloses in FIG. 26 a vertical blind with rigid vanes wherein the facing on one side of the vanes comprises a series of vertical strips of material, each joined along one vertical edge to an adjacent strip, and at the other vertical edge to both the adjacent facing strip on that side of a discrete piece of substantially rigid, planar material forming the vane. The patent further discloses that both a front and a rear facing may be fabricated of such strips, and the strips and rigid vanes can be oriented in either the vertical or horizontal directions.

U.S. Pat. No. 4,631,217, also assigned to Hunter Douglas, discloses in FIG. 2 a honeycomb or cellular type of window covering wherein a series of pleated, generally Z-shaped strips, each formed of a single piece of fabric, are bonded together in a manner whereby each strip forms the front portion of one cell, the rear portion of an adjacent cell, and a dividing wall between the two cells. The dividing walls, however, are incapable of functioning as the vanes of a venetian blind type of product because they remain substantially perpendicular to the front and rear faces of the window covering throughout the full range of expansion and collapse of the cells.

More recently, there has been developed a method of formation of fabric Venetian blinds using a technique of helically winding an elongated strip of fabric. This method is the subject of pending U.S. patent application Ser. No. 08/947,608, filed Oct. 9, 1997, and is also disclosed here. In a preferred embodiment a three-portion strip is initially formed from three side-by-side, longitudinal bands or portions of approximately equal width and length. Each side of the central portion is joined by ultrasonic welding to an edge of the adjacent outer portion. The outer portions are formed of sheer or relatively transparent material, and the central portion is relatively opaque. As a result of the helical winding process, the central portion becomes the blind vane, while the two outer portions ultimately become segments of the front and rear composite facings of the blind. Successive windings are staggered and partially overlapped so that two of the three portions of the underlying winding are covered by the overlying winding. Two longitudinally extended glue lines are applied along the underside of the infeeding overlapping strip, these being positioned to bond together adjacent windings. A tube-like wound structure is formed which, when cut open along a line perpendicular to the helix angle, will result in a fabric venetian blind.

The strips of fabric used to form fabric venetian blinds are likely to also include flaws. As in fabric venetians formed from panels, the flaws in fabric venetians formed from strips tend to be quite noticeable. Consequently, there is a need for a method of detecting and removing flaws from strips of material in a manner which minimizes material loss and can be done rapidly using automated equipment. There is also a need to improve the appearance and minimize the waste in manufacturing such shades without losing any of the durability or manufacturing benefits.

SUMMARY OF THE INVENTION

We provide a method of manufacturing fabric venetian blinds from one or more elongated strips wound around a frame to form a tubular structure. The strip or strips are inspected for flaws before winding. If any flaws are found, a portion of the strip which contains one or more flaws is cut away. Then the strip is reattached to create a joint for each reattachment. The portions that are cut away are sized so that the joints formed by the reattachments will be aligned defining a linear array through the tubular structure which is substantially perpendicular to the edges of the winding. The tubular structure is the cut along that line thereby removing the joints from the flat structure that is formed. If desired two cuts can be made on opposite sides of the joints.

The present method is particularly suited for the method of manufacture in which a single elongated strip is helically wound around a frame to form the tubular structure. The method can also be used when the tubular structure is formed by several strips arranged to overlap concentrically.

Other objects and advantages of our method will become apparent from a description of certain present preferred embodiments shown in the drawings.

DETAILED DESCRIPTION OF PREFERRED EMBODIMENTS

Figure 2:
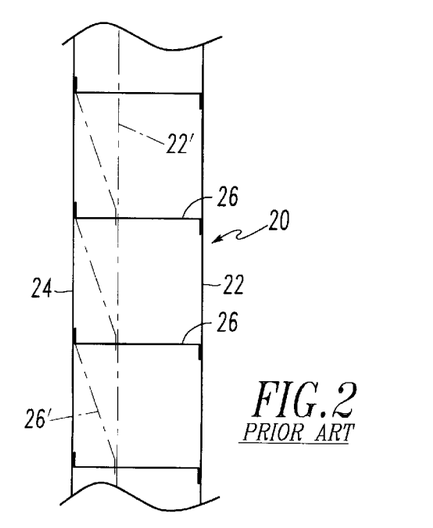
FIG. 2 is a side view, in simplified form, of a representative prior art fabric venetian blind, wherein the vanes are joined to single, continuous-sheet type front and rear sheer panels. The blind is shown in the fully-open position of the vanes, while a partially closed position is shown in phantom lines.
Figure 3:
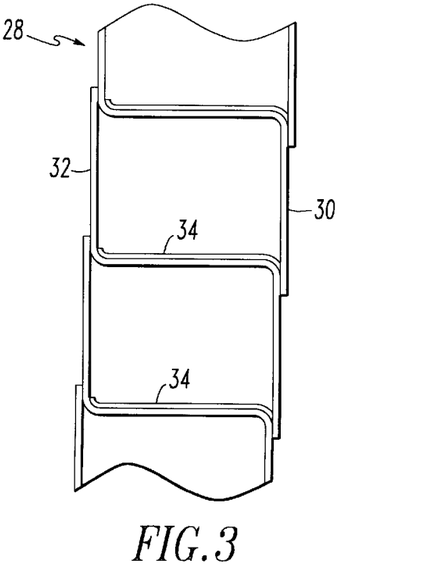
FIG. 3 is an enlarged fragmentary side view of the blind of FIG. 1A.

FIG. 2 of the drawings shows a fabric venetian blind 20 which, in its general construction, is typical of the prior art. The solid lines indicate the fully-open position of the vanes. The blind comprises a front facing 22, rear facing 24 and vanes or slats 26. The front and rear facings are each typically formed of a continuous panel of sheer material, chosen for its combination of soft, aesthetic appeal, its ability to permit a substantial amount of light to be transmitted when the vanes are in their open position, and, depending upon the selected weave, its ability to permit viewing of scenes through the material. The vanes are bonded along their respective longitudinal edges to the front facing and the rear facing. Bonding can be by adhesive or thermal welding. When the wind-up roller from which the blind is suspended is rotated slightly, the front and rear facings shift in a vertical direction relative to each other, causing the angle of the vanes to change. A position near the fully-closed setting of the vanes is shown in phantom in FIG. 2, with the elements labeled with primed numerals.

Figure 1A:
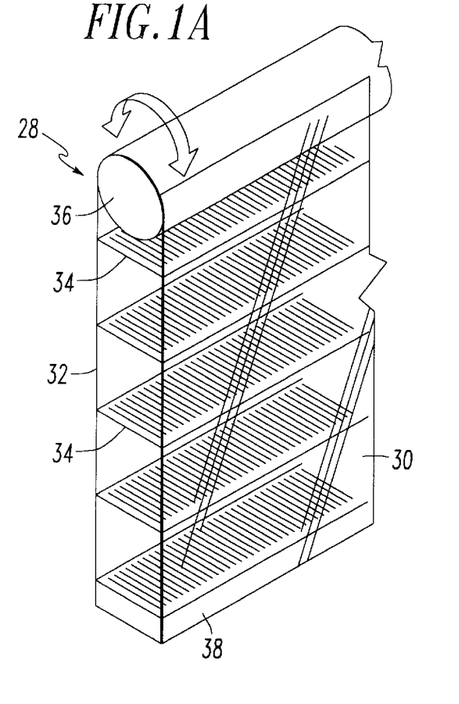
FIG. 1A is a simplified perspective view of the fabric venetian blind of the present preferred invention, shown with the vanes positioned in their maximum light-admitting setting.
Figure 1B:
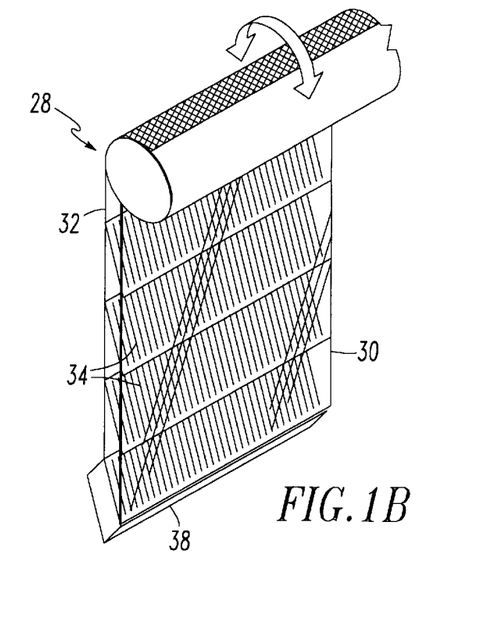
FIG. 1B is a view similar to FIG. 1A, showing the vanes positioned in a partially closed setting.

FIGS. 1A and 1B show, in simplified form, the basic elements of a complete fabric venetian blind assembly 28 in full-open and near-closed conditions, respectively. The blind comprises front and rear sheer or relatively translucent facings 30, 32, respectively, a plurality of relatively opaque vanes, a wind-up roller 36 and a bottom rail 38. Not shown are the cords or other means for rotating roller 36 to adjust the vane angle and to roll the shade around the roller to fully expose all or a portion of the window opening.

Comparing FIGS. 1A and 1B it can be seen how the points of attachment of the front and rear facings to opposite sides of the circumference of the roller result in relative vertical movement of the facings, and therefore adjustment of the vane angle, when the roller is rotated slightly.

Figure 4:
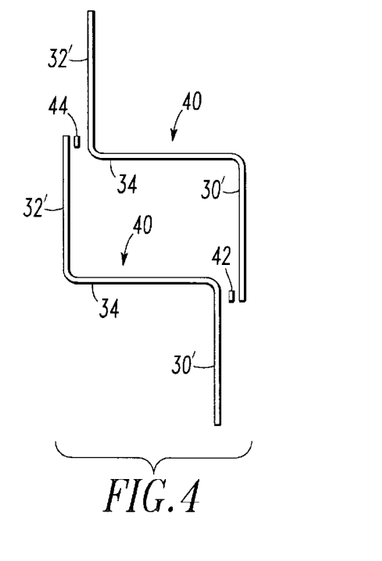
FIG. 4 is an exploded schematic view of the blind of FIG. 3, showing the relationship of adjacent three-portion strips.
Figure 5:
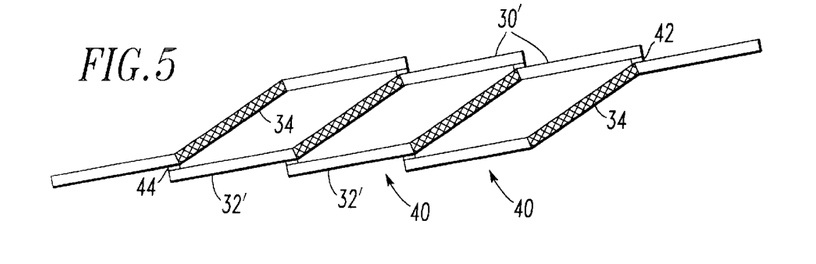
FIG. 5 is an enlarged, simplified view of the blind of FIG. 3, with the vertical scale exaggerated to reveal the relationship of adjacent three-portion strips.
Figure 6:
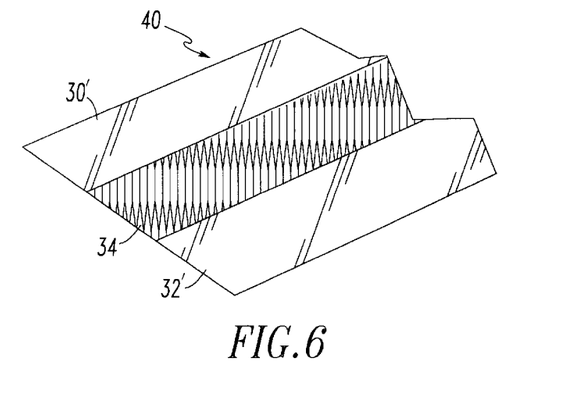
FIG. 6 is a perspective view of a fragment of a three-portion strip such as is used in the embodiments of FIGS. 4 and 5.

FIGS. 3–14 all illustrate the fabricating process used to produce a tubular structure which is cut to form a fabric venetian panel. The preferred embodiment is best shown in FIGS. 4, 5 and 6. Fabrication begins with the creation of an elongated strip 40 (see FIG. 6) having at least two dissimilar fabric materials. The outer portions 30', 32' are formed of relatively translucent or sheer material, while central portion 34 is formed of relatively opaque material. Outer portions 30', 32' may be formed of the same or different fabrics. The central portion can be opacified by use of a more densely woven fabric, or by coating or laminating. The adjoining edges of these portions may be connected by gluing, ultrasonic welding, thermal bonding or stitching. Ultrasonic welding is the preferred method because it is speedy and permits precision location of adjoining edges. This process also beneficially compresses the welded zone and fills the fabric interstices, so that the joint will not be porous to subsequently applied glue lines. Thus, unsightly bleed-through of the glue lines is avoided. The width of strip 40 is approximately three times the desired vane width (i.e. blind thickness in the fully open setting of the vanes).

Unlike known processes of the prior art, the fabric venetian blind of the present method is preferably generated by helically winding the strip upon itself, in partially overlapping fashion, with each winding being bonded to the proceeding winding along uniformly located longitudinal bonding lines. The result is that each winding of strip material 40 constitutes one vane and an adjacent fragment of each of the front and rear facings of the completed fabric venetian blind. An alternative method involves bonding a series of concentric strips in a similar overlapping relationship.

The relationship of adjacent windings of strips 40 is best seen in FIGS. 4 and 5. Each strip winding 40 overlaps approximately two-thirds of the proceeding strip winding. Specifically, the leading edge (i.e., the right edge as viewed in FIG. 6) of a winding is placed at or near the sheer/opaque junction of the proceeding winding. A previously applied front glue line 42 is located on the underside of the upper strip at that contact line, while a previously applied rear glue line 44 is located at the underside of the upper strip or near the junction between the rear sheer portion 32' and the opacified vane portion 34. That rear glue line 44 will then join such strip to the trailing edge of the previously wound or lower strip 40. The preferred method and apparatus for performing the winding steps are described below.

The choice of location of glue lines 42 and 44 relative to the junction between the sheer and opaque portions of each winding is not critical. The opaque portions need not fully span the distance between the front and rear facings, so long as the opaque portions overlap when the blind is in the fully closed position. Glue lines 42 and 44 may be spaced from the edges of the strips, if desired, as when a series of unsupported, fringe-like bands are desired on one or both of the facing panels.

Figure 7:
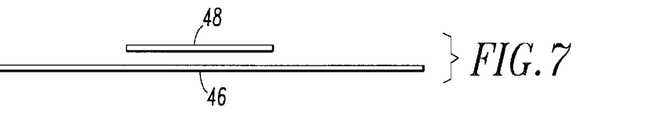
FIG. 7 is an exploded view of a second form of the three-portion strip.
Figure 8:
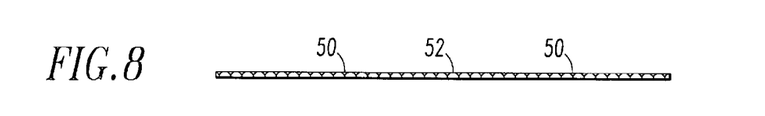
FIG. 8 is a view similar to FIG. 7, showing a third form of three-portion strip.

Alternative forms of the three-portion strip 40 are shown in FIGS. 7 and 8. The strip in FIG. 7 is formed of a full-width relatively translucent portion 46, with a relatively opaque central portion 48 laminated to it by any of the previously described joining techniques. This embodiment is not preferred, because it tends to be too stiff to hang uniformly. In the FIG. 8 embodiment, the three-portion strip is formed of a single piece of fabric, but with less dense weaving patterns being used for the outer portions 50, and a more dense or opaque weaving pattern being used for the central portion 52 which will become the vane of the finished blind. The embodiments of FIGS. 6 and 8 are preferred, because they tend to hang in a more uniform, wrinkle-free manner.

The method and equipment employed for fabricating the preferred embodiment is illustrated in FIGS. 9–12 of the drawings. The manufacturing equipment includes a pair of parallel, non-rotating spars 56, 58 skewed at an angle to two parallel nip roll sets. The first nip roll set 60 serves to drive the fabric by tensioning the upper reach of fabric tube 88. Nip roll set 60 comprises a lower, motor-driven roll 60 and an upper, pressure roll 62. The second nip roll set 66 serves to provide tensioning drag to sheer fabric tube 88. It comprises a lower, motor-driven roll 68 (which is driven in a manner to tension or brake the span of fabric between the drive nip roll set 60) and an upper, steering pressure roll 70. The steering action is described below. Rolls 62 and 68 may be driven by belt-driven sprockets (not shown).

Figure 9:
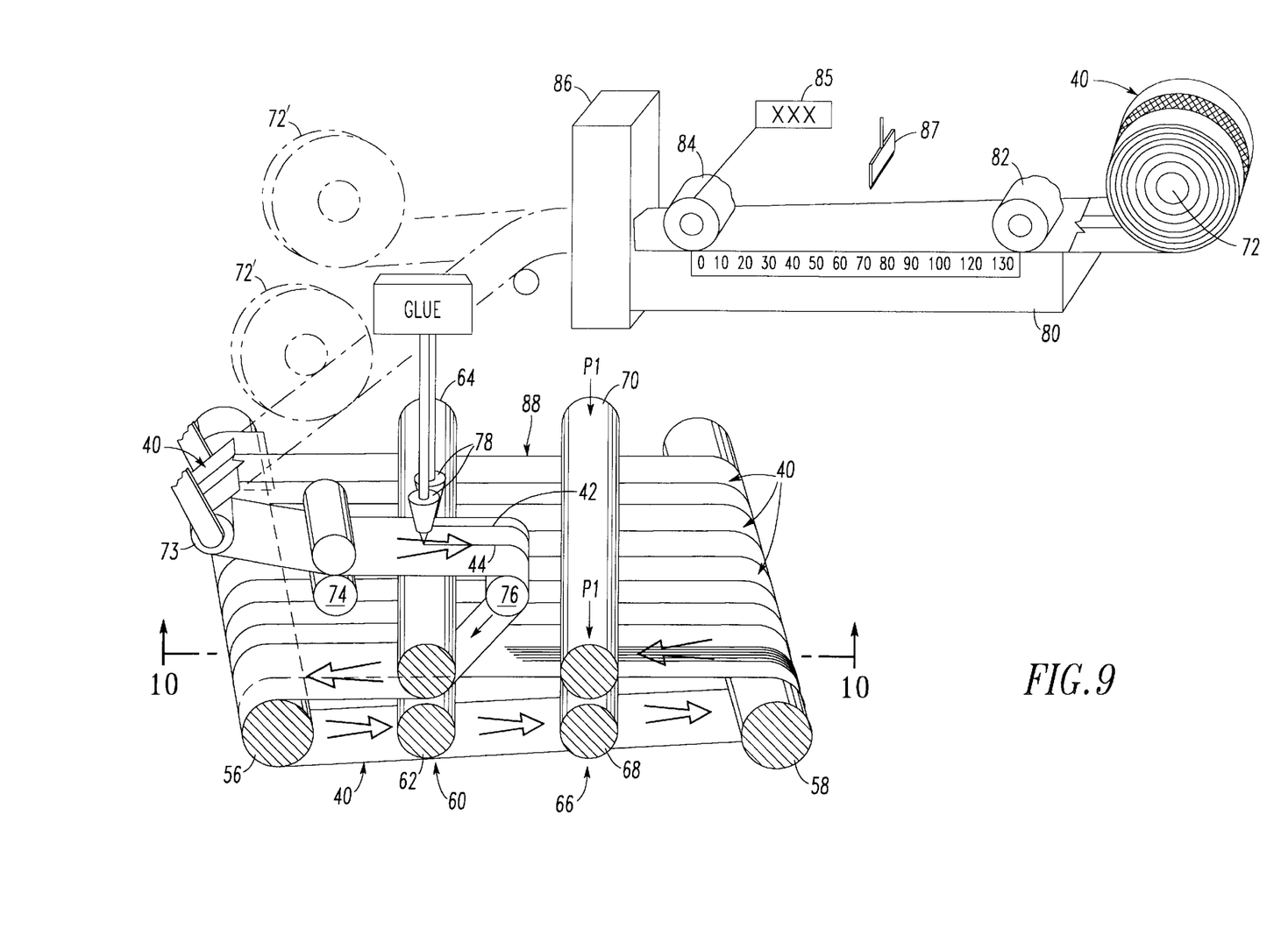
FIG. 9 is a simplified perspective view of equipment suitable for forming a blind using the process of the present invention.
Figure 10:
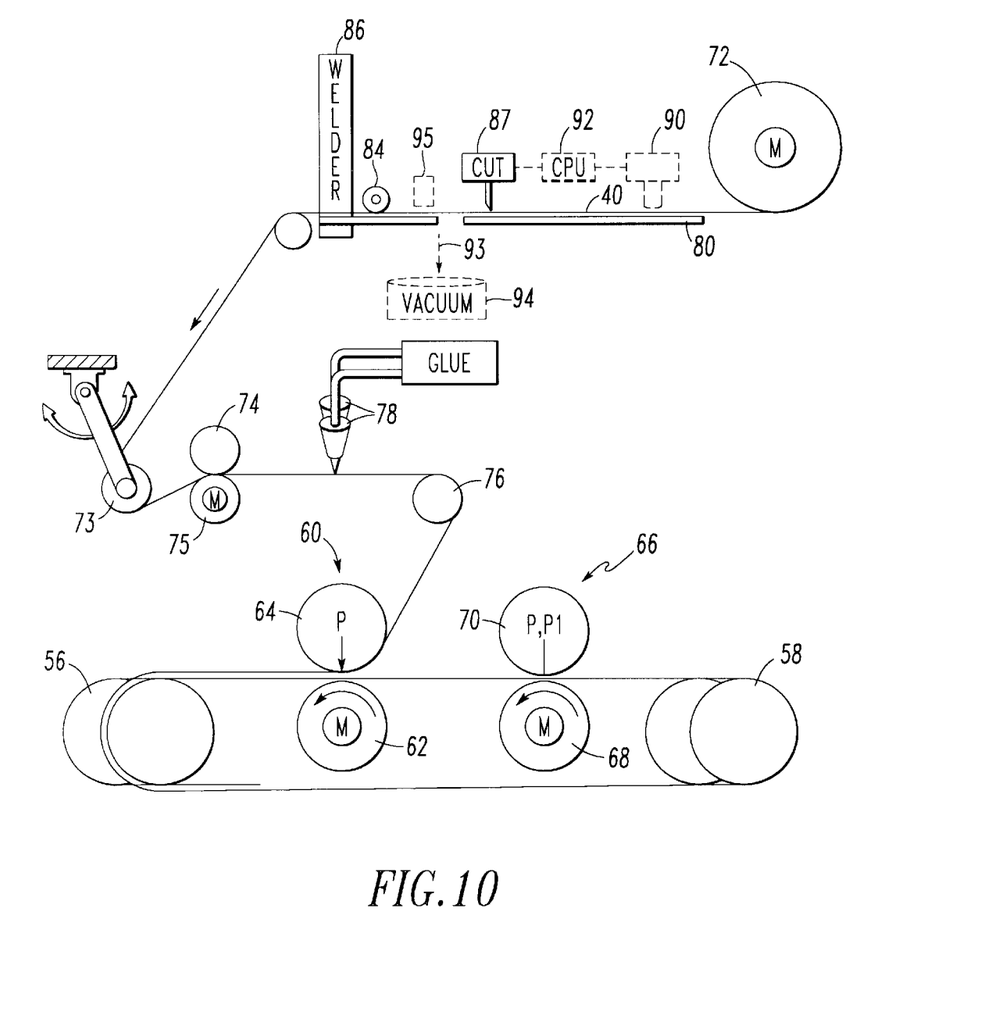
FIG. 10 is a schematic side elevational diagram of the equipment shown in FIG. 9.

The three-portion fabric strip 40 is fed from strip supply roll 72, which has its own drive motor M which drives roll 72 at a speed controlled by the position of dancer 73. If the strip loop around dancer 73 gets smaller, the motor driving roll 72 speeds up to maintain a uniform amount of strip in that portion of the strip feed system. Strip 40 continues from dancer 73 through a nip roll set comprising a upper roll 74 and lower motor-driven roll 75 to tension-sensing roll 76, which is provided with a load cell on its axle. This load cell senses tension in the strip between rolls 76 and 64, and adjusts the speed of motor M associated with nip roll 75 to maintain the desired tension in that position of the in-feeding strip. Two adjacent glue applications 78 apply continuous beads of glue 42, 44 to strip 40.

The support structure for the two pairs of nip rolls 60, 66 comprises main mounting plate 80 (see FIGS. 11–12) and end plate 82 connected thereto by cantilevered beams. End plate 82 supports the end of upper rolls 64, 70 remote from main plate 80, while lower rolls 62, 68 are supported by similar cantilevered beams and end plate 82'. These end plates must be supported in this fashion so that no support structure crosses from inside to outside the fabric loop or tube 88 defined by spars 56, 58. Spars 56, 58 are cantilevered from a separate frame structure 84, which can be pivoted about vertical axle 86 to permit the spars to be set at a predetermined angle relative to the two nip roll sets. This angle is a function of the desired lead angle for the helical winding of strip 40, as will be explained below. Appropriate clearance holes are placed in frame 84 to permit passage of spars 56, 58. The end of cantilevered spars remote from mounting frame 84 is free of connection to supporting structure to permit removal of the continuously formed fabric tube therefrom and to allow adjustment of the spar angle relative to the lower rolls. Alternatively, if spar angle adjustment were deemed unnecessary, the ends of the spars could be attached to the lower roll support or to any other structure lying entirely within fabric loop 88.

As best shown in FIG. 9, formation of the tubular structure begins with the three-portion fabric strip 40 being pulled from the supply roll 72 by drive nip roll set 74, 75. Controlled feed rate of the strip between supply roll 72 and nip roll set 60 is provided by motor-controlling signals from dancer 73. Constant tension in the strip between nip roll set 74, 75 and drive nip set 60 is provided by motor-controlling signals from tension-sensing roll 76, as explained above. The strip is directed past glue applicators 78, and the upper, glue line-bearing side of the strip is inverted by roller 76 so that such glue lines become face-to-face with the preceding winding between the rolls of nip set 60. There, the glue joint is closed and the overlapping windings are bonded to each other.

As will be appreciated by reference to FIG. 5, the infeeding strip 40, with glue lines 42, 44 already applied by applicators 78, must precisely register with the preceding winding traveling on the upper reach of the fabric loop extending from spar 58, through a drag nip roll 66 to drive nip roll set 60, where infeeding strip 40 first comes into contact with the preceding winding for bonding. FIG. 9 shows how the skewing of spar 56 causes the lower reach of the endmost fabric strip winding to shift laterally as it travels to spar 58 and a back to the point between the rolls of drive nip roll set 60 where the incoming strip, with freshly applied glue strips 42, 44 on its underside, is pressed against it. The lateral shift, a result of the helix lead angle, is selected to cause a shift of approximately one-third of the width of the strip 40, so that glue lines 42, 44 will register with the previous winding as shown in FIG. 5. Thus, the required relative positioning of the relatively opaque vane portion 34 with the relatively translucent facing portions 30', 32' will be achieved when the vanes of the finished blind are placed in their light-blocking or fully closed angular setting.

Precise control of the amount of overlap between successive windings is provided by two independent controllers. The first lateral position of infeeding strip 40 from supply roll 72 is provided by a controller (not shown), or other known web guiding device, which laterally shifts the placement of roll 72 along its rotational axis. Additional control of registration of the overlapping windings of strip 40 is provided by a drag nip roll set 66, which has a "steering" capability. Both pressure rolls 64 and 70 are rubber-coated, to provide a compressible surface. Unlike pressure roll 64 of drive in roll set 60, which has a constant force pressing it downward toward drive roll 62, steering pressure roll 70 has independently controllable downward pressure (described below) applied at its opposite ends. When the applied pressures are equal at both ends of roll 70, the roll has a strip-contract zone of uniform width along its entire length, where the rubber is deformed about the unyielding surface of roll 68. The passing fabric strip does not deviate from its straight-line path, and continues to take the shortest route from a spar 58 to nip roll set 60. An increase in the nip pressure at one end of roll 70 increases the concavity of its rubber-controlled surface as it is deformed by the cylindrical contour of the non-yielding surface of the lower roll 68. The path of the fabric strip at the end of the roll lengthens as it is forced to assume the longer curved shape of the further deformed surface of roll 70. That is, the strip-contact zone (at that end) between the opposed rolls of nip roll set 66 increases to a greater segment of an arc about the rigid roll's surface resulting from the extra deformation of the surface of roll 70 straddling a lengthened portion of the perimeter of lower roll 68. The resulting longer strip path on the edge with increased steering pressure creates increased strip tension on that edge, pulling or steering the fabric toward that edge. Reducing pressure at one end similarly reduces the path there relative to the nominal condition, drawing the web toward its other edge.

Because fabric strip 40 has a helix lead angle as it winds onto spar 56 (which is skewed by such angle relative to drive nip roll set 60), the fabric "tube" 88 continuously advances toward the opposite end of the non-rotating spars. The spars are highly polished to facilitate this sliding movement without damage to the fabric.

The spars are preferably sufficiently long to permit them to hold an entire tube formed from a feed roll. For example, a machine has been built with twelve-foot long spars, for use with a three hundred yard long feed roll. The spars may be perforated to permit pressurized air to provide an air bearing to reduce the drag of the fabric tube as it advances along the spars. When the machine is shut down to install a fresh feed roll, the tube may be cut off, using a scissors, by first cutting around the circumference of the tube, generally along a given strip. Then, the severed tube, while still hanging on the spars, is cut along a line C—C (see FIGS. 13–14), which is perpendicular to the edge of the windings, so that the tube may be laid open to form a parallel-edged flat form or slab 90 with the wound strips perpendicular to the parallel edges.

In the presently constructed machine, this slab is about ten feet wide and about ten or more feet long. The fabric slab is then cut to size for particular windows, and the fabric venetian blind is fully formed except for its connection to a wind-up roll and associated hardware.

Figures 11, 12, 13:
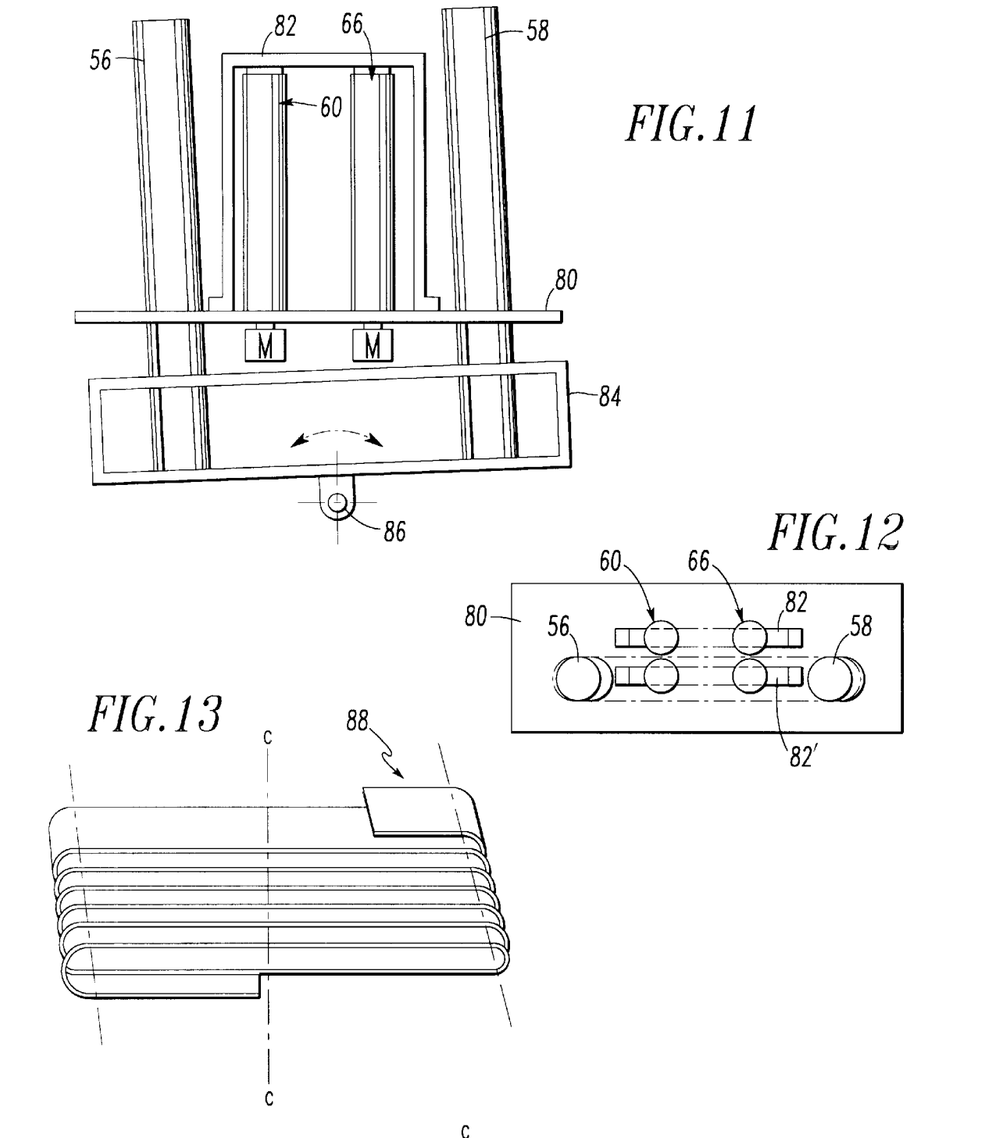
FIG. 11 is a simplified plan view of the equipment of FIG. 9, showing the supporting framework.
FIG. 12 is a simplified side elevational view of the equipment of FIG. 11.
FIG. 13 is a perspective view of a helically wound tube of blind material, prior to being cut open, viewed from the opposite end of the spars from the end shown in FIG. 9.
Figure 14:
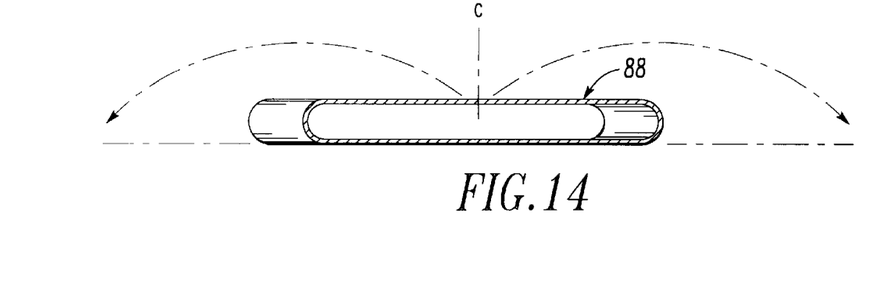
FIG. 14 is a schematic end view, in the direction of the cutting plane C, of the helically wound tube showing how it is cut open to form a full-width venetian blind.

If any flaws are present in the tubular structure shown in FIG. 13, it may be possible to cut the structure along two cut lines parallel to the line C—C to remove the flawed portion. The cut away portion would be discarded and the remaining portion would be fabricated into one or more blinds. However, the procedure could produce a significant amount of waste. Therefore, we provide an inspection, cutting and bonding system shown in FIG. 15 which will produce a roll of fabric having splices or joints from flaw removal at selected locations. When that roll of fabric is formed into the tubular structure of FIG. 13 all of the flaw removal joints will be along the cut line C—C as shown in FIG. 16.

Figure 15:
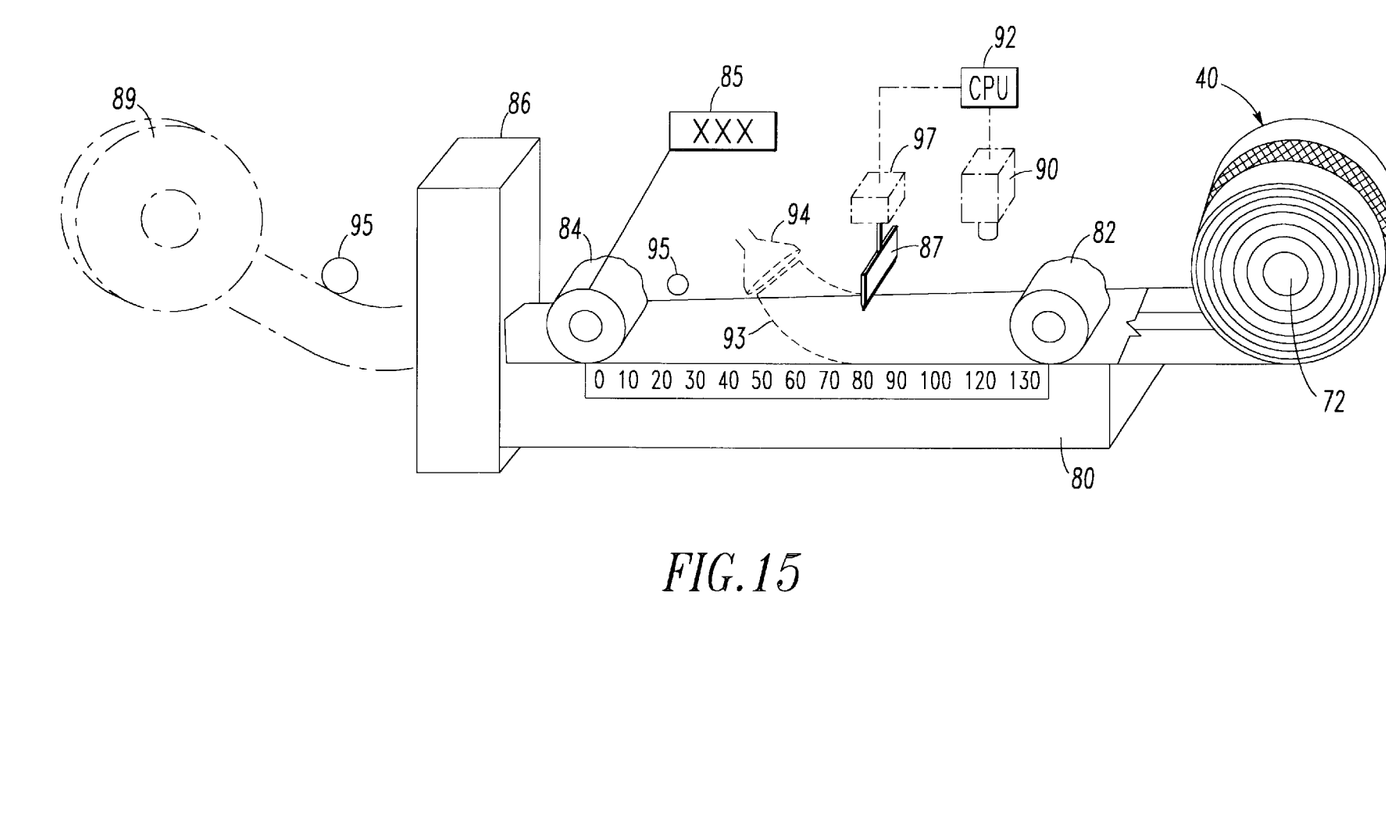
FIG. 15 is a perspective view of a present preferred embodiment of our inspection, cutting and bonding system with optional components shown in dotted line.
Figure 16:
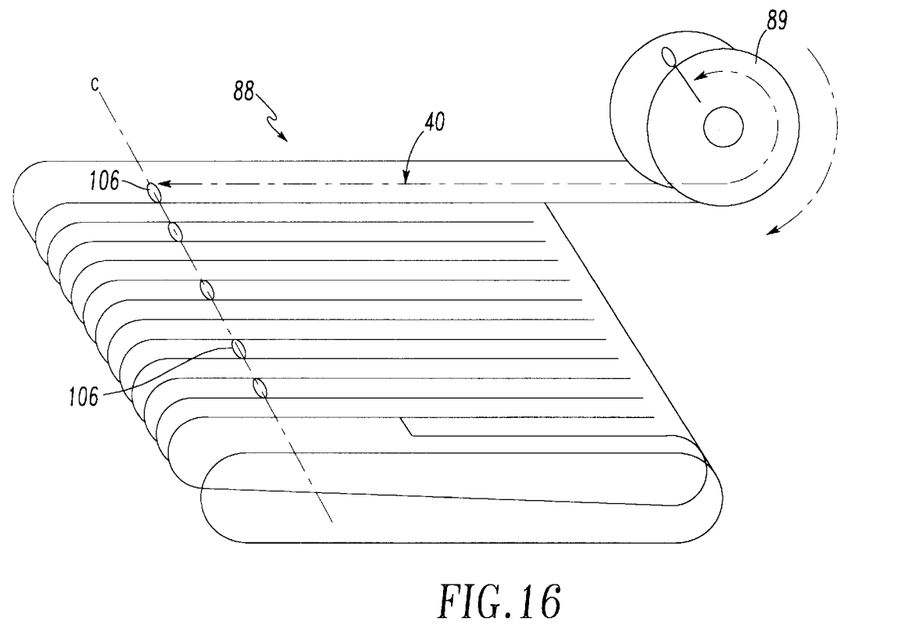
FIG. 16 is a perspective view of a helically wound tube formed from material that has passed through the inspection, cutting and bonding system of FIG. 15.

The inspection, cutting and bonding system shown in FIG. 15 has a table 80 on which the fabric is laid. The fabric 40 is unwound onto the flat straight table 80 having a length longer than the circumference of the tubular structure 80 being formed. In one embodiment that circumference is 121 inches. Thus, the table has a scale marked from 0 to 130 inches. An idler or guide 82 is provided at the entry end of the table. After the fabric crosses the table it passes through a counter 84 having a display 85, through welder 86 to take-up reel 89. A movable knife 87 is provided for cutting the strip at one selected location on the table 80. When forming a tubular structure having a 121 inch circumference, the counter 84 is provided with a 121 inch repeat, showing the number of 121 inch lengths accumulated and the number of inches accumulated for the length in process. When a flaw or need for a splice is identified by the operator, the welder and ribbon feed is halted. By noting the measure on the indexing counter, the operator can cut out the flaw and some adjacent material such that the resulting splice will occur exactly at the end of a 121-inch repeat. For example, if a flaw appears at inch 110 as shown on the scale on the straight run table, and at the time the halt occurred, the counter showed 73 inches, then the operator would cut from inch 73 to inch 111 (as measured on the table scale), forcing the splice to occur at inch 73, which corresponds to the end (or start) of an accumulated length 121 inch length on the take-up reel. The operator repeats this process for every flaw. Repeatedly moving the resulting splices to the end/start of succeeding 121 inch periods in the strip 40, or at a selected point between the end/start position, assures that when that roll is helically-wound into finished fabric, all such splices will occur aligned along a potential cutting line of the wound tube and all areas not at splices will be flaw-free. This can be seen in FIG. 16 where the flaw removal joints 106 are on the cut line C—C in tubular structure 88. If the strip is viewed linearly the distance between the successive joints will be a multiple of the circumference of the tube. For a 121 inch circumference that distance would be 121n where n is an integer greater than zero. Although the fabric strip is shown passing over a single flat table, one could substitute rollers for the table. These rollers could be aligned in a single plane or arranged to direct the fabric through a zig-zag or serpentine path of known length.

In the method just described the operator visually inspects the fabric as it leaves the roll, manually cuts out and discards portions of fabric which contain flaws and then feeds the ends to be bonded into the welder. It is possible to automate all of these manual steps as indicated by the dotted boxes in FIG. 15. A camera 90 with attached computer 92 containing a visual recognition program could be provided to inspect the fabric and identify the flaws and their location. The computer would also be connected to the knife 87 and associated drive motors 97. When a flaw is detected the computer would direct the knife to cut away a portion of the fabric 93 containing the flaw. That portion 93 would be drawn away by vacuum 94 for disposal. The cut ends would then be joined in the welder 86. Counters 84 and sensors 95 would be used to assure that the fabric portions 93 that are cut away are sized so that the joints in the tubular structure form a linear array. The joints will be co-linear along a line perpendicular to the surface of the fabric.

Figure 17:
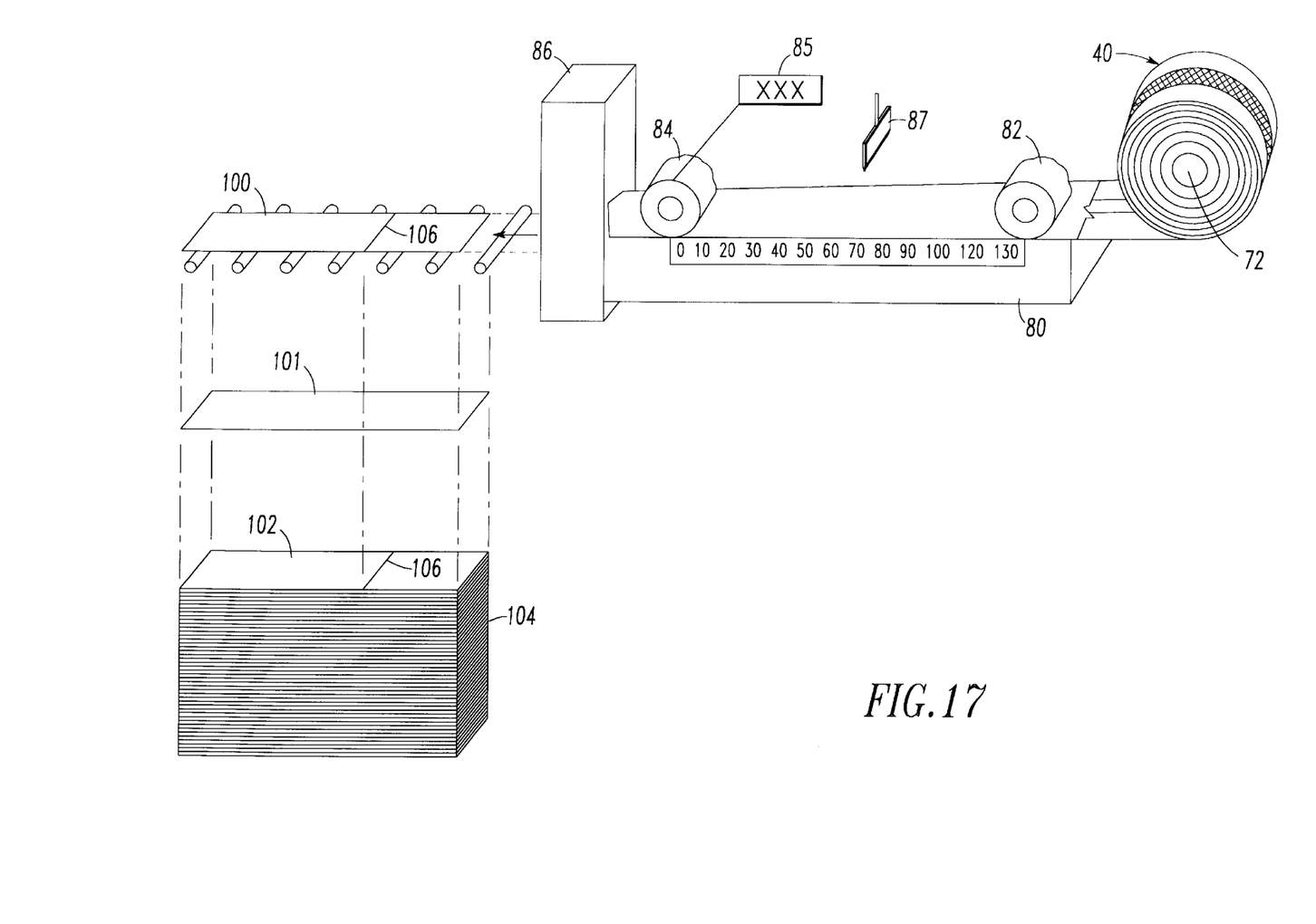
FIG. 17 is a perspective view of a second present preferred embodiment of our inspection, cutting and bonding system.

Although the inspection, cutting and bonding system shown in FIG. 15 is illustrated as creating a roll of fabric for a helically wound tubular structure, that system is useful for more than helically wound tubular structures. FIG. 17 illustrates the system being used to create a series of strips 100, 101, 102 that are cut to length and piled up to form a stack 104. Should a flaw be detected as the fabric passes over table 80 a portion of the fabric is cut away and the cut ends are bonded as in the previous embodiment. This will form a joint 106 in some of the strips 100 and 102. If no flaw is discovered along the desired strip length as the fabric passes over table 80 a flawless strip 101 will be created. After all strips are cut the flaw removal joints 106 in all strips will be aligned in the stack. Rollers 108 are provided to receive the strips from the welder 86. After a complete strip is received on the roller it is pushed away to fall onto stack 104. These strips are then taken from the stack and used as vanes or to form the front or back facing of a fabric venetian in accordance with the teaching of the prior art. For example, the strips could be used to make a venetian blind of the type disclosed in U.S. Pat. Nos. 5,313,999 or 5,664,613. In the assembled blind the joints would lie in a single plane through which a cut would be made to form two panels of fabric venetian material each panel having a standard or desired width. Alternatively, the joints can be aligned with one of the edges of the stack for removal with minimum trimming waste to leave a flawless panel of maximum width.

The fabric system illustrated in FIG. 17 may also be used to form the sheer fabric front panel or rear panel of a fabric venetian blind. In that procedure roll 72 would be much winder so as to correspond to the desired height or width of one or more blinds. What was previously identified as strips 100, 101 and 102 would be panels. If the width of roll 72 corresponds to the height of the fabric venetian blind to be produced, joints 106 would be vertically aligned along a cut line. The assembled fabric venetian material would have a height corresponding to the width of the roll 72 and be cut along the joints to form two panels of standard or desired width. If the width of roll 72 corresponds to the width of the fabric venetian material to be produced, the bond lines 106 would be at locations where a vane is bonded to a panel.

Figure 18:
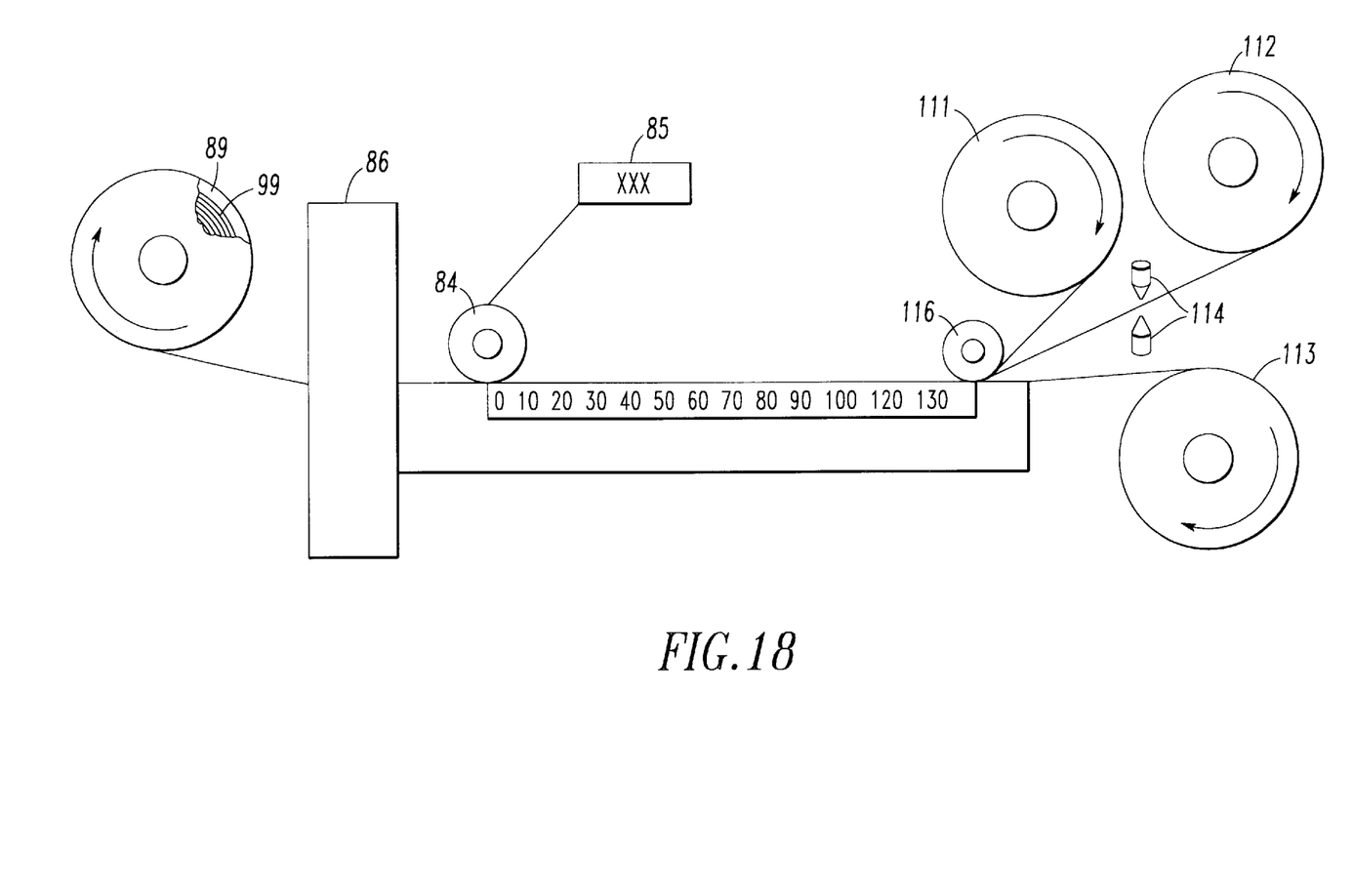
FIG. 18 is a diagram of a third present preferred embodiment of our inspection, cutting and bonding system.

The system shown in FIG. 15 could also be configured as shown in FIG. 18 to accommodate three reels of fabric 111 and 112 and 113 which are glued together to form a strip like that shown in FIG. 6. Reels 111 and 113 contain sheer fabric which is attached to either side of the opaque ribbon fed from reel 112. Glue heads 114 apply a glue line adjacent each longitudinal edge of the ribbon. The sheer strip from reels 111 is attached by one glue line and the sheer strip from reel 113 is attached to the opaque ribbon by the second glue line. Roller 116 guides and presses the strips together as they enter the table 80. Then the assembled structure passes over the inspection table 80. There the structure is inspected and cut and spliced as necessary to remove flaws. The inspected material 99 is wound on take-up reel 89 for storage until processed into a window covering. To the extent that flaw removal joints are present in material 99 they will be at known locations where they will be cut away during blind fabrication. Typically those joints will be spaced apart from one another by a multiple of some selected distance such as 121 inches.

Alternative constructions may include an additional layer of fabric in the vane portion, to create a pocket into which an opaque insert can subsequently be inserted, and the formation of products having multiple rows of vanes or central ligaments.

The winding and inspection techniques disclosed herein may also be used to fabricate products from other types of materials or intended for other fields of use. For example, multi-layered materials made from thermally non-conductive or reflective material may be made for insulation applications. Polarized or tinted films may be used to create desired optical effects; and other materials of selected porosity may be used to form air filtration products.

The invention may be further developed within the scope of the following claims. Accordingly, the above specification is to be interpreted as illustrative of only a few operative embodiments of the invention, and not in a strictly limiting sense.

I claim:

1. A method of forming a multi-layered sheet goods product comprising;
    a. winding at least one elongated strip of material around a support structure in a manner so that each successive winding partially overlaps the immediately preceding winding to a predetermined extent to define an overlap and create a tubular structure;
    b. bonding each successive winding of material to a preceding winding;
    c. before winding the at least one elongated strip, inspecting the at least one elongated strip of material for flaws and removing flaws from the at least one elongated strip of material, wherein a process for removing flaws comprises:
        i. cutting away at least one portion of the material, each portion containing at least one flaw and
        ii. reattaching the at least one strip together after each portion is removed to create a joint for each reattachment,
    wherein the portions that are cut away are sized so that the joints will be aligned so as to form a linear array; and
    d. cutting the tubular structure along the linear array.

2. The method of claim 1 wherein the at least one strip of material is a single strip and the winding is helical.

3. The method of claim 1 wherein each successive winding of material has a first longitudinally extending edge and a second longitudinally extending edge and each successive winding of material is bonded along a longitudinally extending bond line located in proximity to the first longitudinally extending edge of the immediately preceding winding and remote from the first and second longitudinally extending edges of the successive winding.

4. The method of claim 3 also comprising bonding each successive winding of material along a second longitudinally extending bond line located in proximity to the longitudinally extending edge of the successive winding and remote from the first and second longitudinally extending edges of the immediately preceding winding.

5. The method of claim 1 wherein the material is selected from the group consisting of woven fabric, woven fabric having a first portion and a second portion such that the first portion has an opacity different from the opacity of the second portion, knitted fabric and knitted fabric having a first portion and a second portion such that the first portion has an opacity different from the opacity of the second portion.

6. The method of claim 1 wherein the at least one elongated strip is comprised of at least two parallel, adjoining longitudinally extending portions of differing fabrics which meet along a junction line.

7. The method of claim 6 wherein one of the fabric portions is more opaque than another of the fabric portions.

8. The method of claim 6 wherein the bonding of each successive winding occurs along the junction line of each successive winding.

9. The method of claim 1 wherein the at least one elongated strip is comprised of a strip of fabric which has been treated to provide at least two parallel, adjoining longitudinally extending portions of differing opacity.

10. The method of claim 9 wherein the fabric has been treated by applying a covering material over at least one of the longitudinally extending portions.

11. An improved method of forming a multi-layered sheet goods product in which a tubular structure is formed by:
  helically winding an elongated strip of thin, pliable material upon a supporting surface, with each successive winding partially overlapping the immediately preceding winding of a predetermined extent, said strip having first and second longitudinally extending edges; and
  bonding each successive winding of material to the immediately preceding winding along a longitudinally extending bonding line, said bonding line located in proximity to said first edge of said immediately preceding winding and remote from said first and second longitudinally extending edges of said successive winding; wherein the improvement comprises:
  a. before winding the elongated strip, inspecting the at least one elongated strip of material for flaws and removing flaws from the at least one elongated strip of material, wherein a process for removing flaws comprises:
    i. cutting away at least one portion of the material, each portion containing at least one flaw and
    ii. reattaching the at least one strip together after each portion is removed to create a joints for each reattachment,
  wherein the portions that are cut away are sized so that the joints will be aligned so as to form a linear array; and
  b. cutting the tubular structure along the linear array.

12. The method of claim 11 which comprises the further initial step of forming said strip of at least two parallel, adjoining, longitudinally extending portions of differing fabrics.

13. The method of claim 12 wherein one of said fabric portions is more opaque than another of said fabric portions.

14. The method of claim 13 wherein said bonding line is located in proximity to a junction line between said adjoining portions of said successive winding.

15. The method of claim 11 which includes the further step of cutting open the resulting assembly of multiple windings along a cutting line perpendicular to said longitudinally extending bonding lines.

16. The method of claim 11 which comprises the further step of bonding said successive winding of material to said immediately preceding winding along a second, substantially continuous, longitudinally extending bond line located in proximity to said second edge of said successive winding.

17. The method of claim 16 which includes the further step of simultaneously feeding said elongated strip from a plurality of independent sources, the strip from each source forming a winding of material which is bonded to a winding formed from a strip from another of said sources.

18. The method of claim 16 which comprises the further initial step of forming said strip of at least two parallel, adjoining, longitudinally extending portions of differing fabric.

19. The method of claim 16 which includes the further step of cutting open a resulting assembly of multiple windings along a cutting line perpendicular to said longitudinally extending bonding lines.

20. An improved method of continuously forming a multi-layered sheet goods product of the type in which a tubular structure is formed by:
  helically winding elongated strips of thin, pliable material upon a supporting surface, each of said strips comprising a plurality of parallel, longitudinally extending strip portions, each of which strip portions is simultaneously fed from its own independent source during said winding steps;
  bonding the longitudinally extending strip portions together along a first series of longitudinally extending bonding lines to form said strips while bonding portions of each strip to the immediately preceding strip winding along a second series of longitudinally extending bonding lines, with each successive strip winding partially overlapping the immediately preceding strip winding to a predetermined extent, said strips having first and second longitudinally extending edges;
  said second series of bonding lines comprising a first bonding line located in proximity to said first edge of said immediately preceding strip winding and remote from said first and second longitudinally extending edges of said successive strip winding, and a second bonding line located in proximity to said second edge of said successive strip winding wherein the improvement comprises:
  a. before winding the elongated strip, inspecting the at least one elongated strip of material for flaws and removing flaws from the at least one elongated strip of material, wherein a process for removing flaws comprises:
    i. cutting away at least one portion of the material, each portion containing at least one flaw and
    ii. reattaching the at least one strip together after each portion is removed to create a joint for each reattachment,
  wherein the portions that are cut away are sized so that the joints will be aligned along so as to form a linear array; and
  b. cutting the tubular structure along the linear array.

21. The method of claim 20 wherein said strip portions from at least two of said independent sources are formed of differing fabrics.

22. An improved method of making a fabric-type venetian blind window covering of the type in which a tubular structure is formed by:
  forming an elongated fabric strip having at least two parallel, adjoining longitudinally extending first and second portions of relatively translucent and relatively opaque material, respectively
  helically winding said strip upon a supporting surface, with each successive winding partially overlapping the preceding winding to the extent necessary so that the relatively opaque portion of the overlapping layer at least substantially covers the relatively translucent portion of the immediately overlapped layer;

bonding each winding of material to the immediately preceding winding along a substantially continuous longitudinally extending bonding line, said bonding line located to coincide with the junction line between adjoining first and second portions of one of said windings and a free edge of the relatively translucent portion of the other of said windings; wherein the improvement comprises:
a. before winding the elongated strip, inspecting the at least one elongated strip of material for flaws and removing flaws from the at least one elongated strip of material, wherein a process for removing flaws comprises:
   i. cutting away at least one portion of the material, each portion containing at least one flaw and
   ii. reattaching the at least one strip together after each portion is removed to create a joint for each reattachment,
wherein the portions that are cut away are sized so that the joints will be aligned so as to form a linear array; and
b. cutting the tubular structure along the linear array.

23. A method of making rolls or strips of material having no flaws except joints comprised of:

a. providing a supply of material;
b. inspecting the material for flaws and removing flaws from the material, wherein a process for removing flaws comprises:
   i. cutting away at least one portion of the material, each portion containing at least one flaw and
   ii. reattaching the material together after each portion is removed to create a joint for each reattachment,
wherein the portions that are cut away are sized so that the joints will be separated by a multiple of a selected distance from one another; and
c. collecting the material.

24. The method of claim 23 wherein the material is collected onto a take-up reel.

25. The method of claim 23 wherein the material is collected by cutting the material into lengths of material and stacking the lengths of material.

26. The method of claim 23 wherein the material is a fabric.

* * * * *